(12) United States Patent
McGarity et al.

(10) Patent No.: US 9,416,803 B1
(45) Date of Patent: Aug. 16, 2016

(54) CLIP WITH APERTURE OPENING MEANS

(71) Applicants: Ronald M. McGarity, Savannah, GA (US); Mark McGarity, Savannah, GA (US)

(72) Inventors: Ronald M. McGarity, Savannah, GA (US); Mark McGarity, Savannah, GA (US)

(73) Assignee: Geraghty, LLC, Savannah, GA (US)

( * ) Notice: Subject to any disclaimer, the term of this patent is extended or adjusted under 35 U.S.C. 154(b) by 199 days.

(21) Appl. No.: 14/271,941

(22) Filed: May 7, 2014

(51) Int. Cl.
*B42F 1/06* (2006.01)
*F16B 2/22* (2006.01)
*F16B 2/24* (2006.01)

(52) U.S. Cl.
CPC ... *F16B 2/22* (2013.01); *B42F 1/06* (2013.01); *F16B 2/245* (2013.01); *Y10T 24/205* (2015.01); *Y10T 24/44769* (2015.01); *Y10T 24/44923* (2015.01)

(58) Field of Classification Search
CPC .............. F16B 2/22; F16B 2/24; F16B 2/241; F16B 2/245; F16B 2/205; Y10T 24/203; Y10T 24/205; Y10T 24/44769; Y10T 24/44923; Y10T 24/44778; Y10T 24/44786; Y10T 24/44863; Y10T 24/44906; Y10T 24/44932; B42F 1/02; B42F 1/04; B42F 1/06
See application file for complete search history.

(56) References Cited

U.S. PATENT DOCUMENTS

| | | | | |
|---|---|---|---|---|
| 1,493,072 A | * | 5/1924 | Fricker | B42F 1/06 132/284 |
| 1,675,286 A | * | 6/1928 | Van Valkenburg | A44B 99/00 24/555 |
| 4,706,342 A | * | 11/1987 | Yu | B42F 1/02 24/545 |
| 5,309,605 A | * | 5/1994 | Sato | B42F 1/06 24/563 |
| 5,432,982 A | | 7/1995 | Rhijn | |
| 5,806,147 A | * | 9/1998 | Sato | B42F 1/04 24/545 |

* cited by examiner

*Primary Examiner* — Robert J Sandy
*Assistant Examiner* — Michael Lee
(74) *Attorney, Agent, or Firm* — Rodgers & Rodgers

(57) ABSTRACT

A clip for holding items such as folding currency and credit cards that includes a pair of spring arms joined to a base plate with a top and a bottom integrally joined to the spring arms opposite the base plate and extending inwardly therefrom with an aperture formed in the top and a corresponding detent formed in the bottom.

19 Claims, 5 Drawing Sheets

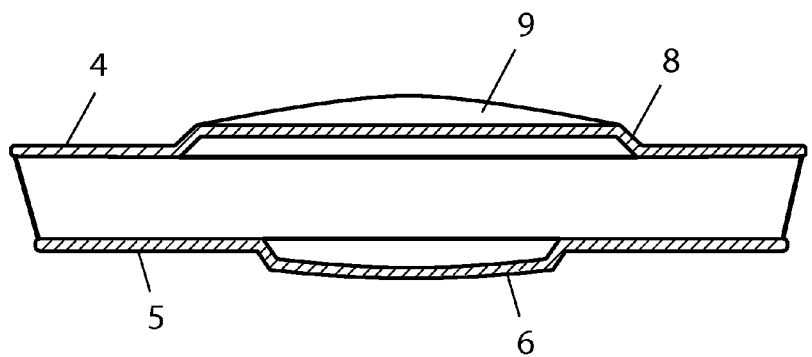
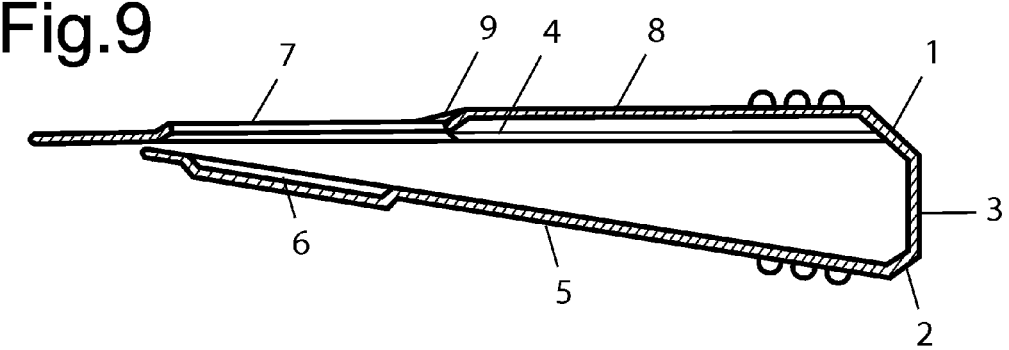

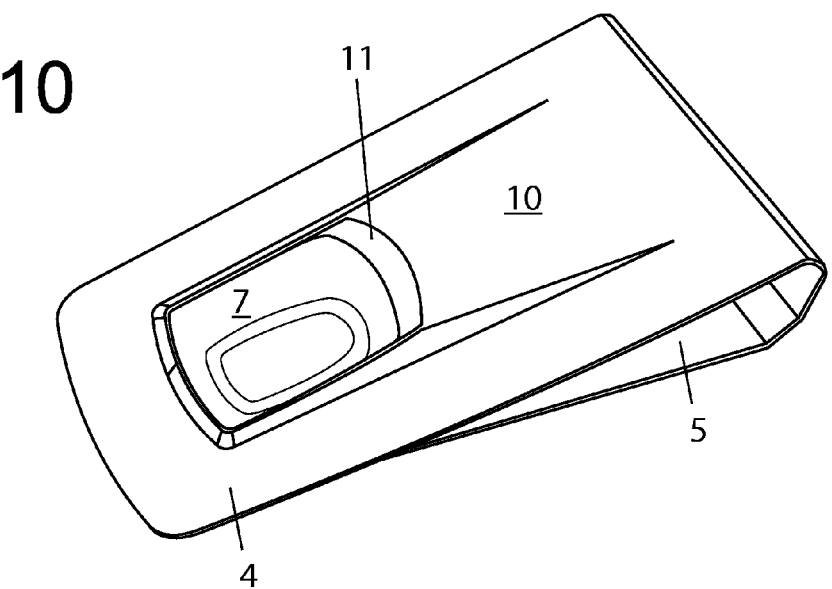
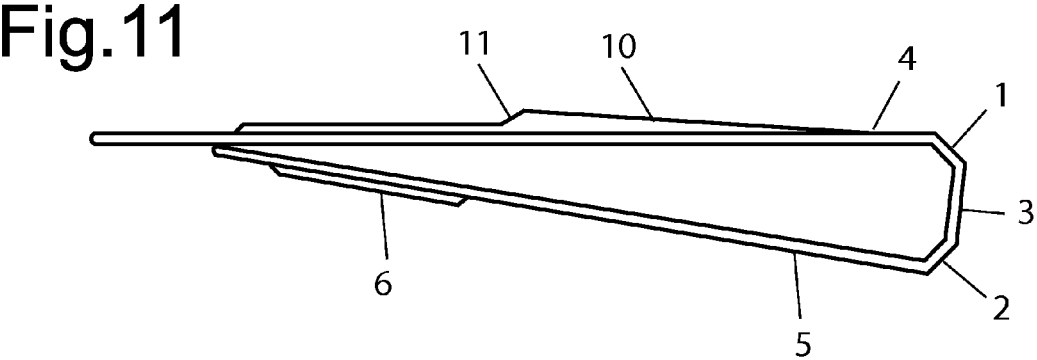

CLIP WITH APERTURE OPENING MEANS

BACKGROUND OF THE INVENTION

Clips are well known for holding various items and especially planar-type items such as sheets of paper, paper currency, credit cards and the like. Persistent problems with many known clips include the difficulty of manually opening the clip. Operating levers in one form or another are utilized to enhance the ability to open the clip and insert the contents. These types of clips are widely accepted and function well except that they tend to be somewhat difficult and expensive to manufacture.

Therefore, there is a need for a clip which is easy and convenient to open, but is inexpensive to manufacture thereby resulting in a lower retail price so as to be attractive to a wide variety of consumers.

BRIEF SUMMARY OF THE INVENTION

By this invention, a clip is provided for holding a variety of items such as folding currency and credit cards and includes a pair of spring arms integrally joined along proximate side edges to a base plate with a top and a bottom integrally joined respectively to the distal side edges of the spring arms and being angularly disposed inwardly of the clip. An aperture is formed in the top in proximity to the free end of the top and a detent is formed in the bottom generally opposite the aperture. A platform is integrally formed on the upper surface of the top with a portion enveloping the aperture and with a thumb ridge formed on the platform adjacent the proximate portion of the aperture.

BRIEF DESCRIPTION OF THE SEVERAL VIEWS OF THE DRAWINGS

In the drawings:

FIG. 8 is a cross-sectional view taken along the line 8-8 in FIG. 1;

FIG. 9 is a cross-sectional view taken along the line 9-9 in FIG. 1;

FIG. 10 is a perspective view of another embodiment of the clip; and

FIG. 11 is a side-elevational view of the clip shown in FIG. 10.

DETAILED DESCRIPTION OF THE INVENTION

Figure 1:
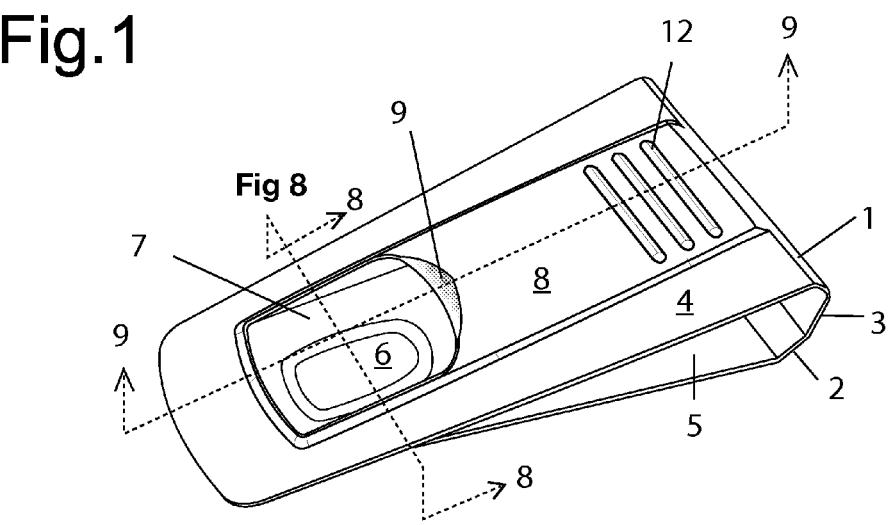
FIG. 1 is a perspective view of the clip according to this invention.
Figure 2:
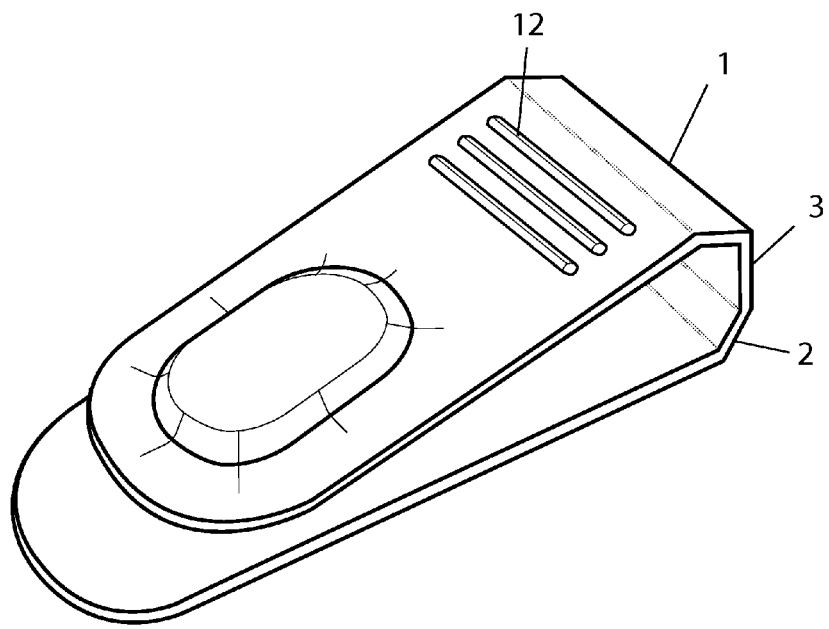
FIG. 2 is a perspective view shown from the bottom side of the clip.
Figure 3:
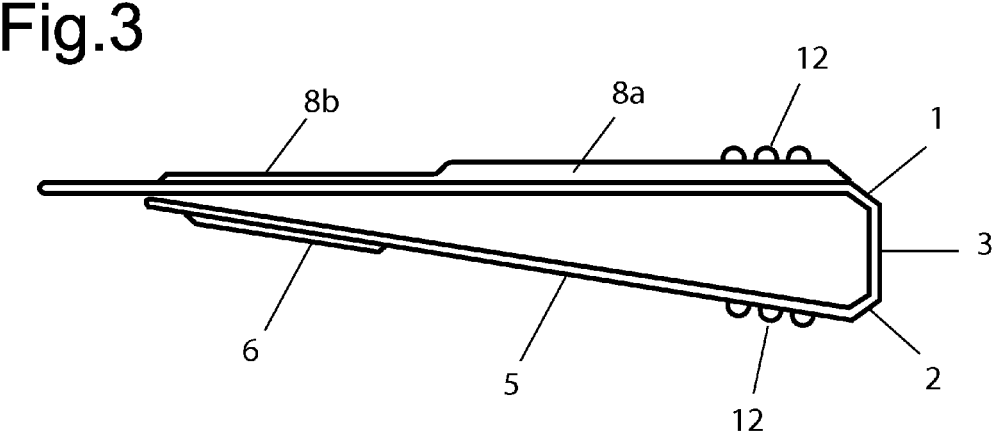
FIG. 3 is a side elevational view.
Figure 4:
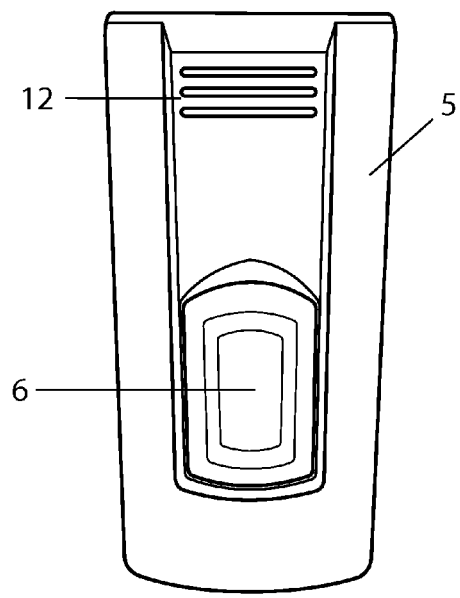
FIG. 4 is a top plan view.
Figure 5:
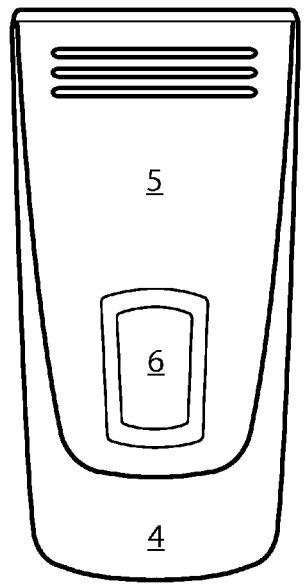
FIG. 5 is a bottom plan view.
Figure 6:
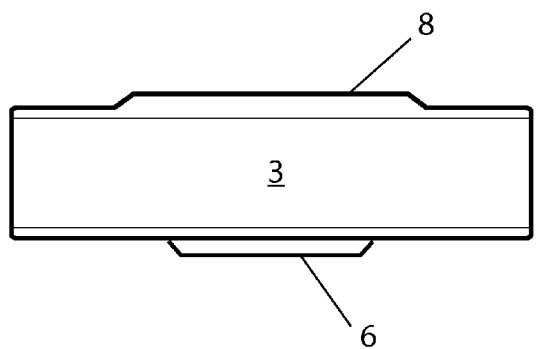
FIG. 6 is an end elevational view taken from the right side of FIG. 1.
Figure 7:
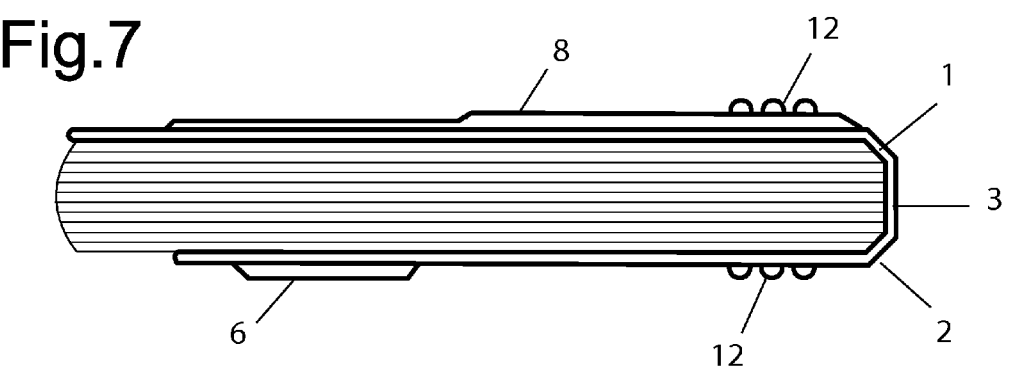
FIG. 7 is a side elevational view showing contents contained within the clip

In the drawings and with particular reference to FIG. 1, the clip in one form, according to this invention, is shown and includes spring arms 1 and 2 joined along their outer or proximate side edges to base plate 3. Top 4 and bottom 5 are integrally joined, respectively, to the inner or distal edges of spring arms 1 and 2 and extend angularly inwardly toward each other. The angular disposition of base plate 3 with respect to spring arms 1 and 2 provides added inward tension to top 4 and bottom 5. As best shown in FIGS. 1-3, for ease of manipulation, the free or distal end of top 4 overlaps the corresponding end of bottom 5. According to this invention, recessed detent 6 is formed on the inside surface of bottom 5 in general proximity to the free end thereof and elongated aperture 7 is formed in top 4 generally opposite detent 6.

According to a further feature of this invention, platform 8 is integrally joined to the upper surface of top 4. The distal end of platform 8 is open and encircles aperture 7 with finger ridge 9 formed therein adjacent the inner periphery of aperture 7. Portion 8a of platform 8 is of a given thickness and portion 8b of platform 8 encircling aperture 7 is of a lesser thickness the result of which is finger ridge 9 formed at the junction of portion 8a and portion 8b adjacent the inner edge of aperture 7. As best shown in FIG. 9, there is a void or pocket formed in portion 8a of platform 8 above top 4. This feature serves to reduce the overall weight of the clip and add spring tension to the clip.

Also, as best shown in FIG. 9, the periphery of aperture 7 formed in top 4 is angled inwardly from the bottom surface of top 4 and then extends vertically upward perpendicular to planar top 4 through portion 8b of platform 8. The inward orientation of substantially the lower half of the periphery of portion 8a enhances sliding of the clip contents both in and out of the clip.

In order to prevent snagging of the contents of the clip on the lower edge of aperture 7 as they are inserted into and withdrawn from the clip, the lower edge of aperture 7 is machine polished to form a smooth somewhat rounded surface around the bottom edge of aperture 7.

A further embodiment of the clip, according to this invention, is shown in FIGS. 10 and 11 wherein platform 10 is integrally formed on the upper surface of top 4 and is tapered upwardly from spring arm 1. Similar to platform 8, shown in FIGS. 1-8, platform 10 extends around the periphery of aperture 7 with finger ridge 11 formed adjacent the peripheral edge of aperture 7.

Elongated raised parallel gripping bars 12 are formed on the outer surface of platform 8 in general proximity to the junction between spring arm 1 and top 4 and on the outer surface of bottom 5 in general proximity to the junction between spring arm 2 and bottom 5.

In operation, since the free end of top 4 extends beyond the free end of bottom 5, the user conveniently places desired contents under the lip of top 4 and, with the free hand holding the clip, inserts a finger through aperture 7 and presses on detent 6 so as to apply pressure to bottom 5 and thereby separate top 4 from bottom 5 so that the contents of the clip are easily inserted therebetween. When the manual pressure applied to bottom 5 is released, the spring force resulting from the inward tension of spring arms 1 and 2 causes top 4 and bottom 5 to close together thereby holding the contents securely within the clip.

An advantage of the clip, according to this invention, includes the angular disposition between spring arms 1 and 2 and the respective top 4 and bottom 5 which results in an increased tension force urging top 4 and bottom 5 together. Such increase in the closing force between top 4 and bottom 5 is not possible with a conventional rounded clip connecting throat.

In addition, the location of aperture 7 in proximity to the free end of top 4 allows for increased leverage in opening the clip and the location of detent 6 generally opposite aperture 7 ensures the proper location of the downward force during opening of the clip.

Finger ridge 9 allows the user to apply additional pressure on the clip during the opening operation. When it is desired to remove contents from the clip, the user can employ one hand to grip the edges of the contents in the clip and, with the other hand, grip raised bars 12 which provide additional manual gripping friction on the clip as the contents are pulled away from the clip. Alternatively, it may be more comfortable and convenient to apply pressure to finger ridge 9 and, with the other hand, simply grasp and withdraw the contents from the clip.

Therefore, by this invention, a clip is provided which is easy and convenient to use and is inexpensive to manufacture.

The invention claimed is:

1. A clip comprising a pair of spring arms integrally joined to a base plate, said spring arms diverging angularly from said base plate, a planar top integrally joined to one of said spring arms remote from said base plate, said top having a free end, a bottom integrally joined to the other of said spring arms remote from said base plate, said top and bottom angularly disposed inwardly of the clip with respect to said base plate and extending angularly toward each other, and an aperture formed in said top and spaced inwardly from said free end.

2. The clip according to claim 1 wherein said free end of said top extends outwardly beyond said bottom.

3. The clip according to claim 1 wherein said aperture is elongated.

4. The clip according to claim 1 wherein a detent is formed in said bottom and is disposed generally opposite said aperture.

5. The clip according to claim 1 wherein an elongated raised bar is formed on said bottom.

6. The clip according to claim 1 wherein said top has an inner and an outer surface and a platform is integrally joined to said outer surface and overlies said planar top.

7. The clip according to claim 6 wherein said platform comprises an opening and said opening envelopes said aperture.

8. The clip according to claim 6 wherein a void is formed between said platform and said outer surface of said top.

9. The clip according to claim 7 wherein an elongated bar is formed on said platform.

10. The clip according to claim 6 wherein said platform is upwardly tapered from said spring arm toward said aperture.

11. The clip according to claim 7 wherein said platform comprises a thumb ridge and said thumb ridge is disposed adjacent the periphery of said aperture.

12. The clip according to claim 10 wherein said platform comprises an opening and said opening envelopes said aperture.

13. The clip according to claim 12 wherein the periphery of said opening extends vertically upward perpendicular to the outer surface of said top.

14. The clip according to claim 1 wherein said aperture comprises a bottom edge and said bottom edge is rounded.

15. The clip according to claim 1 wherein the periphery of said aperture extends angularly inward from the inner surface of said top.

16. A clip comprising a pair of spring arms integrally joined to a base plate, said spring arms diverging angularly from said base plate, a top integrally joined to one of said spring arms remote from said base plate, a bottom integrally joined to the other of said spring arms remote from said base plate, said top and bottom angularly disposed inwardly of the clip with respect to said base plate and extending angularly toward each other, an aperture formed in said top, said top having an inner and an outer surface, a platform integrally joined to said outer surface, and said platform comprising an opening and said opening enveloping said aperture.

17. The clip according to claim 16 wherein said platform comprises a thumb ridge and said thumb ridge is disposed adjacent the periphery of said aperture.

18. A clip comprising a pair of spring arms integrally joined to a base plate, said spring arms diverging angularly from said base plate, a top integrally joined to one of said spring arms remote from said base plate, a bottom integrally joined to the other of said spring arms remote from said base plate, said top and bottom angularly disposed inwardly of the clip with respect to said base plate and extending angularly toward each other, an aperture formed in said top, said top having an inner and an outer surface, a platform integrally joined to said outer surface, and said platform being upwardly tapered toward said aperture.

19. The clip according to claim 18 wherein said platform comprises an opening and said opening envelopes said aperture.

* * * * *